United States Patent Office 2,951,825
Patented Sept. 6, 1960

2,951,825
GLYCIDYL DERIVATIVES OF AMINO PHENOLS

Norman H. Reinking, Millington, and Bruce P. Barth and Foster J. Castner, New Brunswick, N.J., assignors to Union Carbide Corporation, a corporation of New York No Drawing. Filed Feb. 3, 1958, Ser. No. 712,695

25 Claims. (Cl. 260—47)

This invention relates to glycidyl derivatives of those amino phenols in which the amino groups are primary groups. In one of its more particular aspects this invention relates to monomeric polyglycidyl amino phenols in which substantially all of the hydrogens of the hydroxyl groups and substantially all of the replaceable hydrogens of the amino groups present in the amino phenols are replaced with glycidyl radicals,

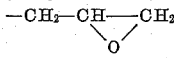

These compounds are useful in preparing curable epoxy compositions and especially in the preparation of epoxy systems having a high heat distortion. Epoxy compositions of this type find use in epoxy tooling and in the manufacture of abrasive wheels.

Glycidyl derivatives of various phenols and amines have been reported in the literature. These have, in general, been prepared by the reaction of a phenol or an amine, respectively, with a suitable alpha-halo-epoxy compound, such as epichlorohydrin, in the presence of a suitable catalyst, for example, an alkali such as sodium hydroxide. This method has, however, generally been characterized by the formation of undesired polymeric products and low yields of the desired monomeric glycidyl derivatives.

It is an object of the instant invention to provide a process for the preparation of glycidyl derivatives of amino phenols.

Another object of this invention is to provide a process for the preparation of these compounds in high yields without the formation of a predominant proportion of polymeric products.

A further object of this invention is to provide novel compositions for the preparation of epoxy systems useful in a wide variety of applications.

Other objects and advantages of this invention will become apparent in the course of the following detailed description and disclosure.

It has been found that compounds such as the triglycidyl derivative of p-amino phenol,

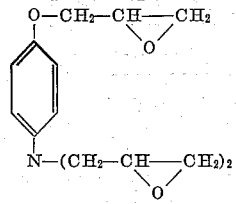

may be prepared by reacting a suitable amino phenol, such as p-amino phenol, with a suitable agent for furnishing an alpha-halo-epoxy radical, for example, epichlorohydrin

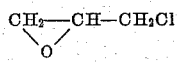

in the presence of a catalytic amount of a lithium compound, for example, lithium chloride, followed by dehydrohalogenation of the resulting halohydrin, e.g., with an alkali such as sodium hydroxide.

The reactions involved in this process may be represented, in the case of the preparation of the triglycidyl derivative of p-amino phenol, by the following equations:

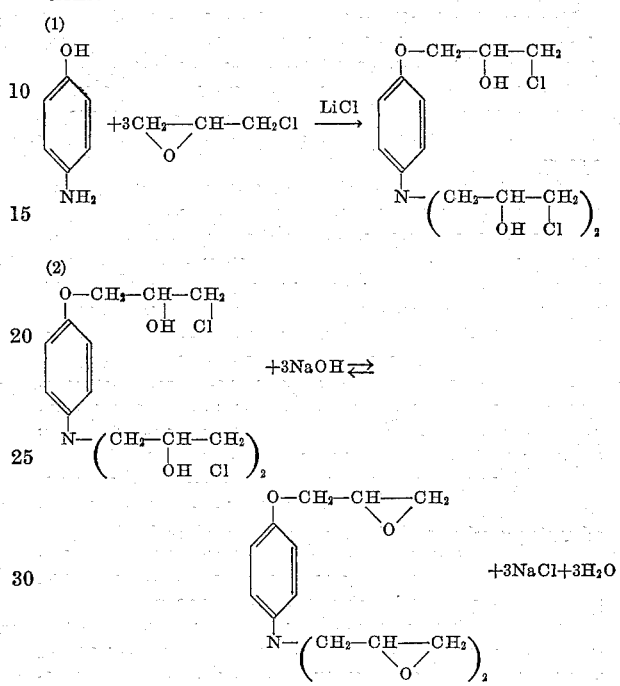

The first reaction is carried out by reacting the amino phenol with epichlorohydrin or other suitable halo-epoxy compound in the presence of a suitable lithium catalyst and water at a temperature in the range, preferably, of from about 25° C. to about 45° C.

While the invention is here illustrated with respect to one particular type of amino phenol, namely the mononuclear amino phenol, it should be understood that the instant invention comprehends any of the amino phenols including amino phenols of the polynuclear type, e.g., 5-amino-1-naphthol, as well as those which have a total of more than two groups comprising amino (primary) groups and phenolic groups e.g., 4-amino resorcinol. The use of alkyl and halogenated substituted amino phenols is also comprehended by this invention. Examples of such amino phenols include 2-methyl-4-amino phenol and 2-chloro-4-amino phenol.

Suitable lithium compounds include lithium hydroxide, lithium oxide and the base forming salts of lithium, such as lithium chloride, lithium bromide, lithium iodide, lithium naphthenate, lithium acetate, lithium propionate, lithium butyrate, and the like.

The quantity of catalyst used can be varied within wide limits but is preferably from about three mole percent to about five mole percent based on the equivalents of phenolic hydroxyl groups present. The amount of water employed may also vary, but is preferably within the range from about 0.001% and 2% by weight, based on the total weight of the reaction mixture.

The halohydrin compound is generally used in stoichiometric excess to minimize the formation of undesired polymeric products which otherwise result. It has been found that a quantity of from about three times to about four times the stoichiometric amount required gives the most desirable results and the highest yields of the desired polyglycidyl monomers.

The first coupling reaction between the epihalohydrin and the amino phenol is conducted at temperatures not exceeding about 70° C. Temperatures in excess of about 70° C. lead to excessive formation of undesirable polymeric compounds. Temperatures within the range of about 25° C. to about 45° C. have been found most suitable since at these temperatures better yields and better quality polyglycidyl derivatives of amino phenols are obtained. The lower the temperature, however, the longer is the reaction time necessary for the first stage coupling to occur.

The reaction is allowed to continue for a long enough time to effect substitution of all of the replaceable hydrogen atoms in each of the hydroxyl and amino groups present in the amino phenol, generally from a minimum of about 10 to 12 hours at temperatures around 45° C. up to a maximum of about 6 days at temperatures around 25° C.

The second reaction, the dehydrohalogenation of the intermediate halohydrin, is carried out after the formation of the halohydrin is completed. An amount of dehydrohalogenating agent, e.g., an alkali such as sodium hydroxide or potassium hydroxide, in excess of the stoichiometric amount called for by the aforementioned Equation 2, has been found to give the best results. For this purpose an excess of from about five weight percent to about twenty-five percent is desirable. The alkali is added to the reaction mixture containing the halohydrin from the first stage of the process. Preferably, the alkali is added in aqueous solution for example, a fifty percent aqueous solution of sodium hydroxide may be used. This second stage of the process of the instant invention is advantageously carried out at a temperature in the range of from about 55° C. to about 60° C. although other temperatures may be used if desired, for example, within the range from about 25° C. to about 80° C.

When the dehydrohalogenation reaction is complete the excess halo-epoxy compound, for example, epichlorohydrin, is removed by distillation under vacuum. It is one of the advantages of the instant invention that the excess epichlorohydrin may be recovered and reused.

The residue from the vacuum distillation is then dissolved in a suitable solvent, such as an aromatic hydrocarbon, for example, toluene, and the resulting solution is then washed with water to remove inorganic salts, for example, sodium chloride, and excess dehydrohalogenating agent which may still be present. The washed solution is then distilled under vacuum to remove the solvent used. The residue remaining after this distillation constitutes a product of this invention, that is, the polyglycidyl amino phenol.

The polyglycidyl products of this invention generally have an epoxy content of about 80% or above, and are substantially free of high polymeric products. By epoxy content is meant the percent of theoretical epoxy actually contained in the product. This value may be calculated by dividing the equivalent weight of the pure polyglycidyl amino phenol by the epoxy equivalent weight of the product.

For example, the mole epoxy equivalent weight of triglycidyl p-amino phenol is 92. A reaction product having an epoxy equivalent of 115 would have an epoxy content of 92/115=80%.

The products of this invention are liquids having a high functionality and low viscosity of from about 1000 to about 5000 centipoises (cps.) at 25° C.

The epoxy equivalent is determined by introducing, into a pressure bottle containing 25 ml. of 1N pyridine hydrochloride in pyridine, an amount of epoxide sample calculated to react with about 50% of the pyridine hydrochloride. The bottle is then sealed and the contents heated at 90° C. in a circulating air oven for a period of 1 hour. At the end of this time the bottle and contents are cooled and 10 drops of phenol-phthalein indicator is added (1.0 gram per 100 ml. of 60% ethanol). The mixture is then titrated to a permanent red end-point with a standard 0.2 N alcoholic KOH solution. A blank is also run in precisely the same fashion without, however, the inclusion of a sample. From the titration data obtained, the amount of pyridine hydrochloride consumed by reaction with the epoxide sample can be calculated and from this the epoxide equivalent can be determined. This value is usually expressed as the number of grams of sample containing one gram-mole of epoxide.

The polyglycidyl products of this invention can be used in the preparation of thermosetting compositions. Such compositions comprise said products and a hardener or catalyst known to be suitable for use with epoxy resins to harden same. Suitable hardeners are, e.g., polyhydric phenols, such as bisphenol A, 2,2-bis-(parahydroxyphenyl) propane, primary and secondary polyamines (e.g., m-phenylene diamine, 4,4'-methylene dianiline), polyamides, polymercaptans, polycarboxylic acids or anhydrides (e.g. maleic anhydride, endo-methylene tetrahydrophthalic anhydride or its alkyl ester), and the like. Suitable catalysts are alkalies, amines, quaternary ammonium compounds, boron trifluoride complexes (e.g. boron trifluoride piperidine complex and boron trifluoride monoethyl amine complex), and the like. Primary and secondary amines can act as both hardeners and catalysts, i.e. as combined hardener-catalysts.

The polyglycidyl products of this invention may be used in combination with other epoxy resins, if desired, to prepare thermosetting compositions.

In preparing the thermosetting compositions of this invention, the polyglycidyl products are mixed with either (a) the hardener in proportions from about 50% to 300% of the stoichiometric proportions, when a hardener is employed; or (b) in those cases where catalysts are employed, amounts from about 0.05% to about .7% by weight of the catalyst, based on the weight of the polyglycidyl product are used. If desired, the amounts of hardeners or catalysts may be varied outside the given ranges, but we presently prefer to use the amounts noted.

The term "hardening agent," wherever the context so requires or admits, is intended to include both catalysts and hardeners, as aforesaid.

The mixing of the glycidyl derivatives and hardening agents may be done either at room temperature (25° C.) or at elevated temperatures, up to about 100° C. The hardening agent is added either per se, or in solution in a suitable solvent.

The curing of the thermosetting compositions of this invention is conducted in suitable molds, at temperatures which may vary widely, from about room temperature to about 200° C., depending on the reactivity of the ingredients in the composition. Normally, the curing operation, if at elevated temperatures, is conducted by raising the temperature gradually to the final temperature, and then holding it thereat for a period of a few hours. For example, the preferred curing cycle with polycarboxylic acids or anhydrides and aromatic amines is about 1–2 hours at 75°–100° C., followed by 2–16 hours at 160°–185° C. With aliphatic polyamine hardeners, the curing cycle is 1–2 hours at room temperature, followed by 2–3 hours at 120°–150° C. With boron trifluoride complexes, the curing cycle is 4 to 6 hours at 100°–120° C. followed by 2–16 hours at 160°–185° C.

The thermoset compositions of this invention are characterized by high heat distortion and good chemical resistance. They are suitable for use as epoxy resins, e.g., in epoxy tooling and abrasive wheel applications, in electrical relays, gears, bearings, whose mechanical function would be impaired by dimensional changes caused by high temperatures. They can also be used in combination with fibers, for example, glass fibers, as effective heat insulating mediums as in the construction of ovens or as instrument cases which may be subjected to extremes of temperature.

The invention may be better understood by reference to the following examples, wherein all parts are by weight unless otherwise noted, and which are included for purposes of illustration only and are not to be construed as in any way limiting the scope of this invention.

EXAMPLE I

*Preparation of the glycidyl derivative of p-amino phenol*

A mixture of 48.4 g. (0.444 mole) of p-amino phenol, 370 g. of epichlorohydrin (4 moles), 84 g. of ethyl alcohol (95%) and 0.65 g. of lithium hydroxide monohydrate, dissolved in 6 cc. of water (3.7 mole percent based on equivalents of phenolic hydroxyl), was reacted together at room temperature (25° C.) for 137 hours and with agitation. The mixture was then heated to 55°–60° C., and 66.5 g. (1.66 moles) of sodium hydroxide in 50% aqueous solution (by weight) was added over a period of 3½ hours.

The water, alcohol and excess epichlorohydrin were removed by distillation under reduced pressure (30 millimeters of mercury) to a residue temperature of 65° C. The residue was dissolved in toluene and washed with water to remove salt and excess caustic. The toluene solution of the resulting glycidyl derivative was then stripped of toluene by distillation under reduced pressure (30 mm. Hg) to a residue temperature of 120° C. The resulting dark colored liquid had an epoxy equivalent weight of 104 g./g.-mole which was 88% of theory for the triglycidyl derivtive. The viscosity of the product was 1250–1350 cps. at 25° C.

EXAMPLE II

One hundred parts of the product of Example I were mixed with varying amounts of a hardener comprising the eutectic mixture of 60 parts of m-phenylene diamine and 40 parts of 4,4'-methylene dianiline sold under the trademark "Sonite" 41 by Smooth-On Mfg. Co. The mixture was made at room temperature (25° C.) and poured into molds 8" x 1¼" x ¼". The weight of the mixture required to fill the molds was 50 g. Six different ratios as hereinafter given were cast and cured for 1 hour at 75° C. plus 1 hour at 100° C. plus 16 hours at 185° C. The cured bars were then tested for flexural strength (ASTM D–790–49T) and heat distortion (ASTM D–648–457). The results were as follows:

| Parts "Sonite" 41 per 100 parts triglycidyl p-amino phenol | 15 | 17 | 20 | 23 | 28 | 33 |
|---|---|---|---|---|---|---|
| Heat Distortion, ° C. | 200 | 202 | 205 | 209 | 199 | 200 |
| Flexural Strength at 25° C., p.s.i. | 16,900 | 15,400 | 13,700 | 16,200 | 9,100 | 10,400 |

The maximum heat distortion value of 209° C. is approximately 60° C. higher than a composition of the diglycidyl ether of bisphenol A hardened with a comparable amount of "Sonite" 41, i.e., with an amount of this hardener required to give the highest heat distortion with the diglycidyl ether of bisphenol A.

EXAMPLE III

One hundred parts of the product of Example I was mixed with varying amounts, as noted below, of methyl ester of endo-methylene-tetrahydrophthalic anhydride, known in the trade as methyl nadic, a product of National Aniline Division of Allied Chemical and Dye Co. Castings prepared as in Example II were cured for 2 hours at 170° C. plus 16 hours at 185° C. Heat distortion values were as follows:

| Parts methyl nadic per 100 parts triglycidyl p-amino phenol | 41 | 67 | 100 | 133 | 167 |
|---|---|---|---|---|---|
| Heat Distortion, ° C. | 58 | 98 | 152 | 213 | 192 |

The maximum heat distortion value of 213° C. is approximately 80° C. higher than that of a comparable composition prepared from the glycidyl ether of bisphenol A.

EXAMPLE IV

One hundred parts of the product of Example I was mixed with varying amounts of boron trifluoride-piperidine complex, designated as Code 2083, and sold by General Chemical Co. The complex can be dissolved in triglycidyl p-amino phenol at 50° C. and remains in solution upon cooling to room temperature or lower (−18° C.). This system ages very slowly at 25° C. and makes possible the preparation of a "one package" system that is heat reactive. Castings were prepared as in Example II and cured 6 hours at 120° C. plus 16 hours at 185° C. Heat distortion values were as follows:

| Parts BF₃-piperidine per 100 parts triglycidyl p-amino phenol | 3 | 5 |
|---|---|---|
| Heat Distortion, ° C. | 246 | 243 |

These values are approximately 80° C. higher than those for comparable systems using the glycidyl ether of bisphenol A.

It is thus seen that the products of the instant invention are characterized in that they form epoxy systems having high heat distortion values when heated with conventional epoxy catalysts or hardeners. It is surprising that the heat distortion values should be so much greater than in the case of the polyglycidyl ethers of polyhydroxy aromatic compounds such as bisphenol A.

What is claimed is:

1. Glycidyl derivatives of amino phenols having one aromatic primary amino group and a maximum of two phenolic hydroxyl groups as the sole groups capable of reacting with epichlorohydrin wherein each hydrogen atom of each hydroxyl group and each hydrogen of the primary amino group is replaced by a glycidyl radical.

2. Polyglycidyl derivatives of amino phenols having a maximum of two phenolic hydroxyl groups and having one aromatic primary amino group as the sole groups capable of reacting with epichlorohydrin, said derivatives having an epoxy content of at least about 80%.

3. Polyglycidyl derivatives of amino phenols having a maximum of two phenolic hydroxyl groups and having one aromatic primary amino group as the sole groups capable of reacting with epichlorohydrin wherein the number of glycidyl radicals is equal to at least about 80% of the sum of the number of said hydroxyl groups and twice the number of amino groups present in said organic compound.

4. Triglycidyl p-amino phenol having the formula:

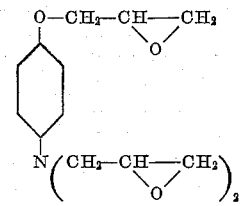

5. A process for the preparation of polyglycidyl derivatives of amino phenols having one aromatic primary amino group and a maximum of two phenolic hydroxyl groups as the sole groups capable of reacting with epichlorohydrin which comprises reacting a mixture containing said amino phenol, epichlorohydrin and a catalytic amount of a lithium compound for a period of time sufficient to produce the corresponding chlorohydrin of said amino phenol and dehydrochlorinating chlorohydrin thus formed.

6. The process of claim 5 wherein the amino phenol is p-amino phenol.

7. The process of claim 5 wherein the lithium compound is a base forming lithium compound.

8. The process of claim 5 wherein the lithium compound is lithium hydroxide.

9. The process of claim 5 wherein the lithium compound is lithium chloride.

10. The process of claim 5 wherein sodium hydroxide is used as the dehydrochlorinating agent.

11. The process of claim 5 wherein potassium hydroxide is used as the dehydrochlorinating agent.

12. The process of claim 5 wherein the polyglycidyl derivative has an epoxy content of at least 80%.

13. A process for the preparation of monomeric polyglycidyl derivatives of amino phenols having one aromatic primary amino group and a maximum of two phenolic hydroxyl groups as the sole groups capable of reacting with epichlorohydrin which comprises reacting a mixture containing the said amino phenol, epichlorohydrin in an amount of from about three times to about four times the stoichiometric amount required and a catalytic amount of a base forming lithium compound for a period of time sufficient to produce the chlorohydrin of said amino phenol, treating the chlorohydrin thus formed with an alkali in an amount which is from about five weight percent to about twenty-five weight percent in excess of the stoichiometric amount required, and recovering the resulting polyglycidyl derivative.

14. A heat curable resinous composition comprising a polyglycidyl derivative of an amino phenol having one aromatic primary amino group and a maximum of two phenolic hydroxyl groups as the sole groups capable of reacting with epichlorohydrin and having at least about 80% as many glycidyl radicals as the sum of the number of phenolic hydroxyl groups and twice the number of aromatic amino groups, and a suitable epoxy resin hardening agent therefor selected from the group consisting of polyhydric phenols, primary amine, secondary amines, polyamides, polymercaptans, polycarboxylic acids, polycarboxylic acid anhydrides, alkalies, quaternary ammonium compounds, and boron trifluoride complexes.

15. The composition of claim 14 wherein the amino phenol is p-amino phenol.

16. The composition of claim 14 wherein the epoxy resin hardening agent is an eutectic mixture of m-phenylene diamine and 4,4'-methylene dianiline.

17. The composition of claim 14 wherein the epoxy resin hardening agent is the methyl ester of endo-methylene-tetrahydrophthalic anhydride.

18. The composition of claim 14 wherein the epoxy resin hardening agent is a complex of boron trifluoride and piperidine.

19. A heat curable resinous composition comprising a polyglycidyl derivative of an amino phenol having one aromatic primary amino group and a maximum of two phenolic hydroxyl groups as the sole groups capable of reacting with epichlorohydrin and having all of the replaceable hydrogen atoms of the amino and hydroxy groups in the molecule replaced by glycidyl radicals, and a suitable epoxy resin hardening agent therefor selected from the group consisting of polyhydric phenols, primary amine, secondary amines, polyamides, polymercaptans, polycarboxylic acids, polycarboxylic acid anhydrides, alkalies, quaternary ammonium compounds, and boron trifluoride complexes.

20. A heat curable resinous composition comprising triglycidyl p-amino phenol having the formula:

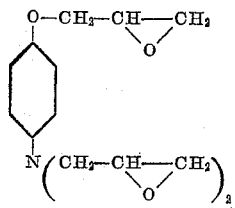

and a suitable epoxy resin hardening agent for the polymerization thereof selected from the group consisting of polyhydric phenols, primary amines, secondary amines, polyamides, polymercaptans, polycarboxylic acids, polycarboxylic acid anhydrides, alkalies, quaternary ammonium compounds, and boron trifluoride complexes.

21. A heat curable resinous composition comprising triglycidyl p-amino phenol having the formula:

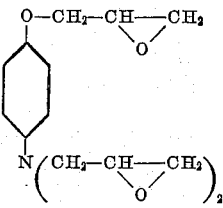

and boron trifluoride-piperidine complex.

22. A heat curable resinous composition comprising 100 parts of triglycidyl p-amino phenol having the formula:

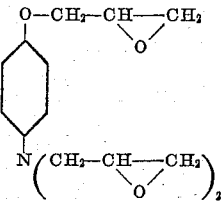

and from about three parts to about five parts of boron trifluoride-piperidine complex.

23. The polymers produced by heat curing a heat curable resinous composition comprising a polyglycidyl derivative of an amino phenol having one aromatic primary amino group and a maximum of two phenolic hydroxyl groups as the sole groups capable of reacting with epichlorohydrin having at least about 80% as many glycidyl radicals as the sum of the number of phenolic hydroxyl groups and twice the number of aromatic primary amino groups, and a suitable epoxy resin hardening agent therefor selected from the group consisting of polyhydric phenols, primary amines, secondary amines, polyamides, polymercaptans, polycarboxylic acids, polycarboxylic acid anhydrides, alkalies, quaternary ammonium compounds, and boron trifluoride complexes.

24. The polymers of claim 23 wherein the polyglycidyl derivative of the amino phenol is triglycidyl p-amino phenol having the formula:

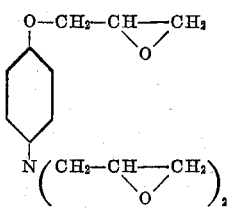

25. The polymers produced by curing a heat curable resinous composition comprising 100 parts of triglycidyl p-amino phenol having the formula:

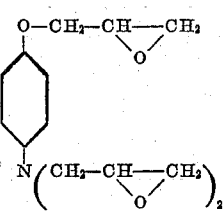

and from about three parts to about five parts of boron trifluoride-piperidine complex.

References Cited in the file of this patent

UNITED STATES PATENTS

| | | |
|---|---|---|
| 1,977,253 | Stallmann | Oct. 16, 1934 |
| 2,324,483 | Gastan | July 20, 1943 |
| 2,712,000 | Zech | June 28, 1955 |

FOREIGN PATENTS

| | | |
|---|---|---|
| 145,614 | Great Britain | June 29, 1920 |
| 155,575 | Great Britain | Nov. 24, 1920 |
| 155,576 | Great Britain | Nov. 24, 1920 |